US012260265B2

(12) United States Patent
Wang et al.

(10) Patent No.: US 12,260,265 B2
(45) Date of Patent: Mar. 25, 2025

(54) CLOUD-BASED COMPUTE RESOURCE CONFIGURATION RECOMMENDATION AND ALLOCATION FOR DATABASE MIGRATION

(71) Applicant: Microsoft Technology Licensing, LLC, Redmond, WA (US)

(72) Inventors: Wenjing Wang, Bellevue, WA (US); Joyce Yu Cahoon, Woodinville, WA (US); Yiwen Zhu, San Francisco, CA (US); Ya Lin, Bellevue, WA (US); Subramaniam Venkatraman Krishnan, San Jose, CA (US); Neetu Singh, Duvall, WA (US); Raymond Truong, Seattle, WA (US); Xingyu Liu, Seattle, WA (US); Maria Alexandra Ciortea, Bucharest (RO); Sreraman Narasimhan, Sammamish, WA (US); Pratyush Rawat, Snoqualmie, WA (US); Haitao Song, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 524 days.

(21) Appl. No.: 17/556,781

(22) Filed: Dec. 20, 2021

(65) Prior Publication Data

US 2023/0029888 A1 Feb. 2, 2023

Related U.S. Application Data

(60) Provisional application No. 63/228,450, filed on Aug. 2, 2021.

(51) Int. Cl.
*G06F 9/50* (2006.01)
*G06F 16/21* (2019.01)

(52) U.S. Cl.
CPC .......... *G06F 9/5083* (2013.01); *G06F 9/5011* (2013.01); *G06F 9/5077* (2013.01); *G06F 16/214* (2019.01)

(58) Field of Classification Search
CPC .... G06F 9/5083; G06F 9/5011; G06F 9/5077; G06F 16/214; G06F 9/4856; G06F 2209/501; G06F 9/5005; G06F 16/217
See application file for complete search history.

(56) References Cited

U.S. PATENT DOCUMENTS 11,153,394 B1* 10/2021 Eberlein ................. H04L 67/61
2018/0124189 A1* 5/2018 Edgington .......... H04L 41/5096
(Continued)

FOREIGN PATENT DOCUMENTS

EP 3547126 A1 10/2019

OTHER PUBLICATIONS

"CPU Benchmarks", Retrieved from: https://web.archive.org/web/20210716054206/https://www.cpubenchmark.net/, Jul. 16, 2021, 4 Pages.

(Continued)

*Primary Examiner* — Jorge A Chu Joy-Davila
(74) *Attorney, Agent, or Firm* — Weaver IP L.L.C.

(57) ABSTRACT

Methods, systems, apparatuses, and computer-readable storage mediums described herein are directed to determining and recommending an optimal compute resource configuration for a cloud-based resource (e.g., a server, a virtual machine, etc.) for migrating a customer to the cloud. The embodiments described herein utilize a statistically robust approach that makes recommendations that are more flexible (elastic) and account for the full distribution of the amount of resource usage. Such an approach is utilized to develop a personalized rank of relevant recommendations to a customer. To determine which compute resource configuration (Continued)

to recommend to the customer, the customer's usage profile is matched to a set of customers that have already migrated to the cloud. The compute resource configuration that reaches the performance most similar to the performance of the configurations utilized by customers in the matched set is recommended to the user.

20 Claims, 9 Drawing Sheets

(56) References Cited

U.S. PATENT DOCUMENTS

| | | | |
|---|---|---|---|
| 2019/0306236 A1* | 10/2019 | Wiener | H04L 41/0897 |
| 2021/0224298 A1* | 7/2021 | Singi | G06N 20/00 |
| 2022/0086241 A1* | 3/2022 | Sharma | H04L 67/1097 |
| 2022/0103433 A1* | 3/2022 | Akhilesham | G06N 5/01 |

OTHER PUBLICATIONS

Chowdhury, et al., "A Framework for Automated Monitoring and Orchestration of Cloud-Native applications", In Proceedings of International Symposium on Networks, Computers and Communications (ISNCC), Oct. 20, 2020, 6 Pages.

"International Search Report and Written Opinion Issued in PCT Application No. PCT/US22/032415", Mailed Date: Aug. 31, 2022, 13 Pages.

* cited by examiner

CLOUD-BASED COMPUTE RESOURCE CONFIGURATION RECOMMENDATION AND ALLOCATION FOR DATABASE MIGRATION

CROSS-REFERENCE TO RELATED APPLICATION(S)

This application claims priority to U.S. Provisional Patent Application No. 63/228,450 entitled "CLOUD-BASED COMPUTE RESOURCE CONFIGURATION RECOMMENDATION AND ALLOCATION FOR DATABASE MIGRATION," and filed on Aug. 2, 2021, the entirety of which is incorporated by reference herein.

BACKGROUND

With the range of cloud-based services offered, it has become increasingly more attractive for customers that have database instances located on-premises to migrate to the cloud. Many methods exist that support migrating legacy systems to the cloud from generic surveys to complex machine learning (ML) algorithms. Yet, despite this rich ecosystem of solutions and best practices, such solutions tend to be cumbersome and have resulted in subpar customer satisfaction. Thus, encouraging more customers to migrate to the cloud remains an open challenge.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums described herein are directed to determining and recommending an optimal compute resource configuration for a cloud-based resource (e.g., a server, a virtual machine, etc.) for migrating a customer to the cloud. The embodiments described herein utilize a statistically robust approach that makes recommendations that are more flexible (elastic) and account for the full distribution of the amount of resource usage. Such an approach is utilized to develop a personalized rank of relevant recommendations to a customer. To determine which compute resource configuration to recommend to the customer, the customer's usage profile is matched to a set of customers that have already migrated to the cloud. The compute resource configuration that reaches the performance most similar to the performance of the configurations utilized by customers in the matched set is recommended to the user.

Further features and advantages of the disclosed embodiments, as well as the structure and operation of various embodiments, are described in detail below with reference to the accompanying drawings. It is noted that the disclosed embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 1:
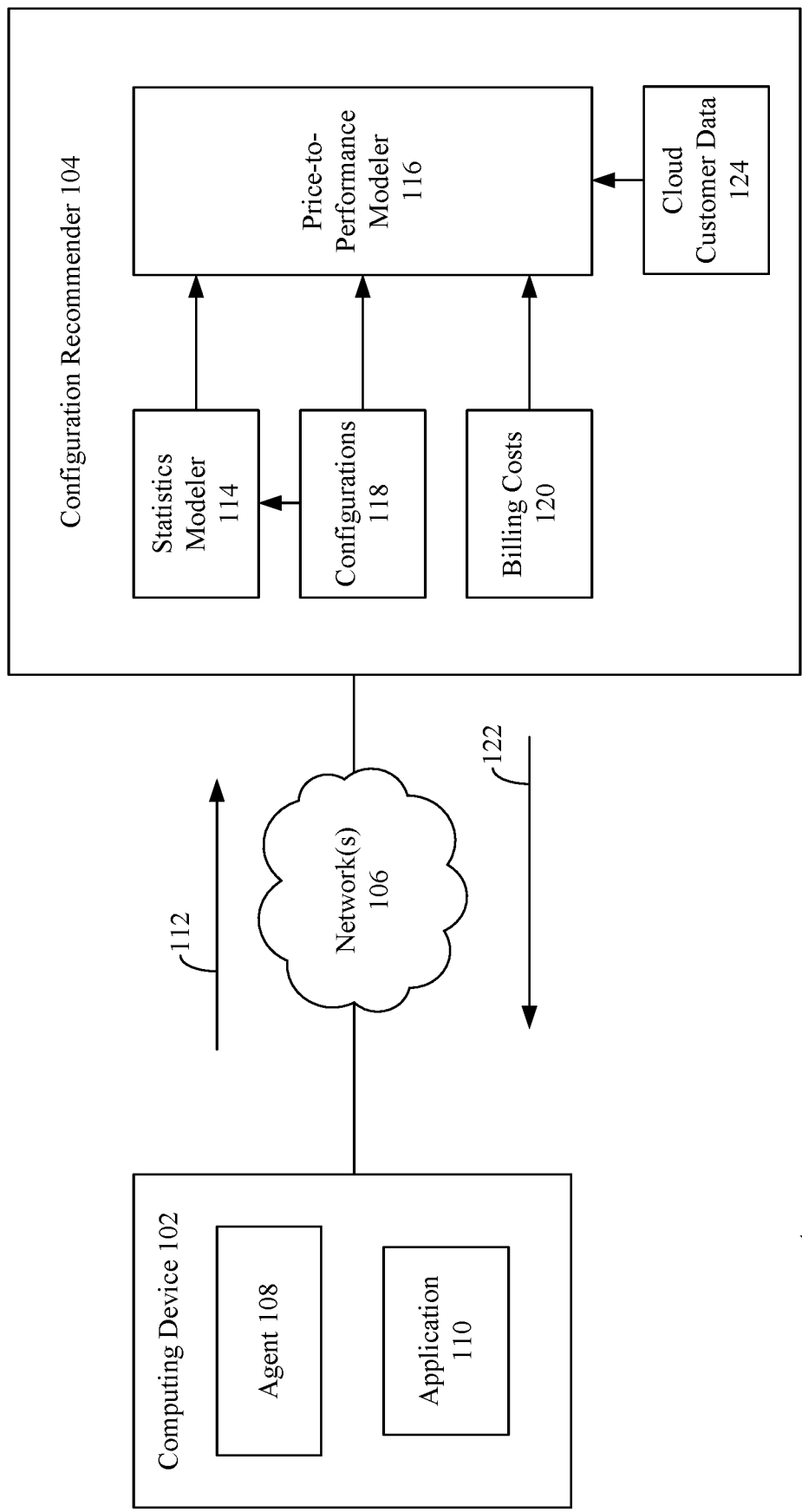
FIG. 1 is a block diagram of a system configured to recommend a compute resource configuration to a customer in accordance with an example embodiment.

The features and advantages of the disclosed embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

Database customers face a bewildering array of compute resource configuration choices (also referred as stock keeping units (SKUs)) during migration. Accurate and personalized recommendations will help increase a customer's propensity to migrate to a cloud platform, ensure a smooth migration experience, and result in less post-migration friction (for example due to wrong sizing). Data Migration Assistant™, published by Microsoft® Corporation of Redmond, Washington, utilized a 2-layer neural network to recommend SKUs to a customer. The neural network was trained on query statistics that were collected by replaying workloads from internal customers on different database offerings in the cloud. In order to use this model for inference, the tool needed to run customers' on-prem queries and collect the relevant query statistics to pass into the neural network. Unfortunately, the recommendations provided by this model were highly conservative. Given its non-linear nature, it was difficult for field engineers to interpret its results. As the engineering team could not explain why the model suggested a customer move their workloads to a particular on-cloud SKU, this algorithm was deprecated for a much less black-box approach. In accordance with this approach, the customer's current on-premise (or on-prem) physical CPU (central processing unit) benchmark was calculated, and the matching target in the cloud was identified among the existing offers. Only a subset of on-prem databases were migrated, and the matching target was ensured to fulfill this database load based on the query statistics, file size, and throughput. Additional benefits were projected to remind customers of additional savings that can be realized. Unfortunately, this "lift-and-shift" process is very time consuming and difficult to scale.

As a result, another baseline solution was introduced to the Data Migration Assistant®, which is based on identifying the maximum CPU, data storage, memory and input/output (IO) requirements among the telemetry collected from one or more on-prem instances. Based on this max vector, consisting of 4 data points (CPU, data storage, memory and IO), the closest matching service (e.g., a platform as a service (PaaS)) offering is made. However, it has been observed that this solution tends to overprovision the customer, as the recommendation is based solely on the max values of the telemetry collected without sacrifice on any usage dimension.

The embodiments described herein solve the aforementioned issues. In particular, the embodiments described herein utilize a statistically robust approach that makes recommendations that are more flexible (elastic) and account for the full distribution of the amount of resource usage. Such an approach is utilized to develop a personalized rank of relevant recommendations to a customer. To determine which compute resource configuration to recommend to the customer, the customer's usage profile is matched to a set of customers that have already migrated to the cloud. The compute resource configuration that reaches the performance most similar to the performance of the configurations utilized by customers in the matched set is recommended to the user.

The embodiments described herein not only adapt to the customer workload, but also allow the customer to make decisions based on decisions that were made by customers that exhibited similar workload behavior. For example, the customer might exhibit periods of high CPU utilization, but those phases are not typical and not reflective of their usual workload. In accordance with the elastic approach described herein, such anomalous usage may be filtered out, and the customer workload is profiled and compared against thousands of existing customers in the cloud. As a result, customers will be able to obtain recommendations that are more flexible, in that recommendations are not based on their max utilization, but rather based on their typical utilization pattern and based on current cloud customers that exhibit the most similar behavior.

By basing recommendations based on their typical utilization pattern (and not on their max utilization), compute resources (e.g., CPU cores, memory, storage, etc.) allocated in the cloud for the customer may be minimized. Moreover, the power consumed, for example, by a datacenter via which the cloud is implemented is decreased, as less compute resources are allocated. Furthermore, the functioning of on-premise devices of the customer is improved, as such devices no longer have to execute the applications and/or maintain the data that are migrated to the cloud. Moreover, the techniques described herein reduce the likelihood of a configuration being selected that would cause application throttling to occur. This ensures that the customer's workload executes without suffering a loss in performance.

Embodiments may be implemented in a variety of systems. For instance, FIG. 1 is a block diagram of a system 100 configured to recommend a compute resource configuration to a customer in accordance with an example embodiment. As shown in FIG. 1, system 100 comprises a computing device 102 and a configuration recommender 104. System 100 is described in detail as follows. Computing device 102 and configuration recommender 104 may be communicatively coupled via one or more networks 106:

although the embodiments described herein are not so limited. For instance, configuration recommender 104 may be incorporated in computing device 102. Examples of network(s) 106 include, but are not limited to, include, local area networks (LANs), wide area networks (WANs), enterprise networks, the Internet, etc., and may include one or more of wired and/or wireless portions.

Computing device 102 is configured to execute an agent 108 and an application 110. Application 110 may be a database application configured to execute statements to create, modify, and delete data file(s) stored in an associated database based on an incoming query, although the embodiments described herein are not so limited. Queries may be user-initiated or automatically generated by one or more background processes. Such queries may be configured to add data file(s), merge data file(s) into a larger data file, re-organize (or re-cluster) data file(s) (e.g., based on a commonality of data file(s)) within a particular set of data file, delete data file(s) (e.g., via a garbage collection process that periodically deletes unwanted or obsolete data), etc.

Agent 108 is configured to profile application 110 during execution thereof and determine computing resource-related metrics and/or consumption resulting from execution. For instance, agent 108 may obtain metrics associated with resources, such as, but not limited to, operating systems, applications (e.g., application 110), services executing on computing device 102, hardware and virtual resources maintained by computing device 102 (CPUs, storage disks, memories, etc.), and/or I/O network bandwidth, power, etc., associated therewith. The metrics may represent numerical data values that describe an aspect of such resources at a particular point of time. For example, the metrics may represent CPU usage, memory and/or storage utilization, input/output operations per second (IOPS) with respect to storage devices, the data size of the customer (e.g., a summation of all data file sizes of the customer), the log rate with respect to log files (e.g., a rate of transactions being made with respect to log files), I/O latency (e.g., the latency incorrect for write and/or read transactions issued by application instances), etc. Such metrics may be collected at regular intervals (e.g., each second, each minute, each hour, each day, etc.) and may be aggregated as a time series (i.e., a series of data points indexed in time order). Agent 108 may collect multiple days or weeks of worth data to obtain the behavior of the metric during execution of application 110. Agent 108 may generate a time series for each metric and provide each time series (shown as time series data 112) to configuration recommender 104 via network(s) 106.

Configuration recommender 104 comprises a statistics modeler 114 and a price-to-performance modeler 116. Statistics modeler 114 is configured to receive time series data 112 and analyze the time series for each metric to generate a distribution function (e.g., an empirical cumulative distribution function) for each metric with respect to each compute resource configuration available for data migration. A description of each compute resource configuration may be included in configurations 118. Configurations 118 may comprise a data structure or file that stores the specifications for each available compute resource (and configuration thereof) that is available for data migration. For instance, configurations 118 may specify, for each available cloud-based compute resource configuration, the number of CPU cores supported by the compute resource configuration, the maximum amount of memory supported by the compute resource configuration, the maximum storage or data size supported by the compute resource configuration, the number of IOPs supported by the compute resource configuration, the log rate supported by the compute resource configuration, the minimum latency supported by the compute resource configuration, etc. Each available cloud-based compute resource configuration available for migration is part of a cloud-based platform, such as the Microsoft® Azure® cloud computing platform, owned by Microsoft Corporation of Redmond, Washington, although this is only an example and not intended to be limiting. Each cloud-based compute resource may comprise a server (or "node") or a virtual machine instantiated on the server. As described above, each cloud-based compute resource may have a particular configuration (e.g., a particular configuration of processor cores, memory, storage space, supported IOPS, etc.).

Figure 2:
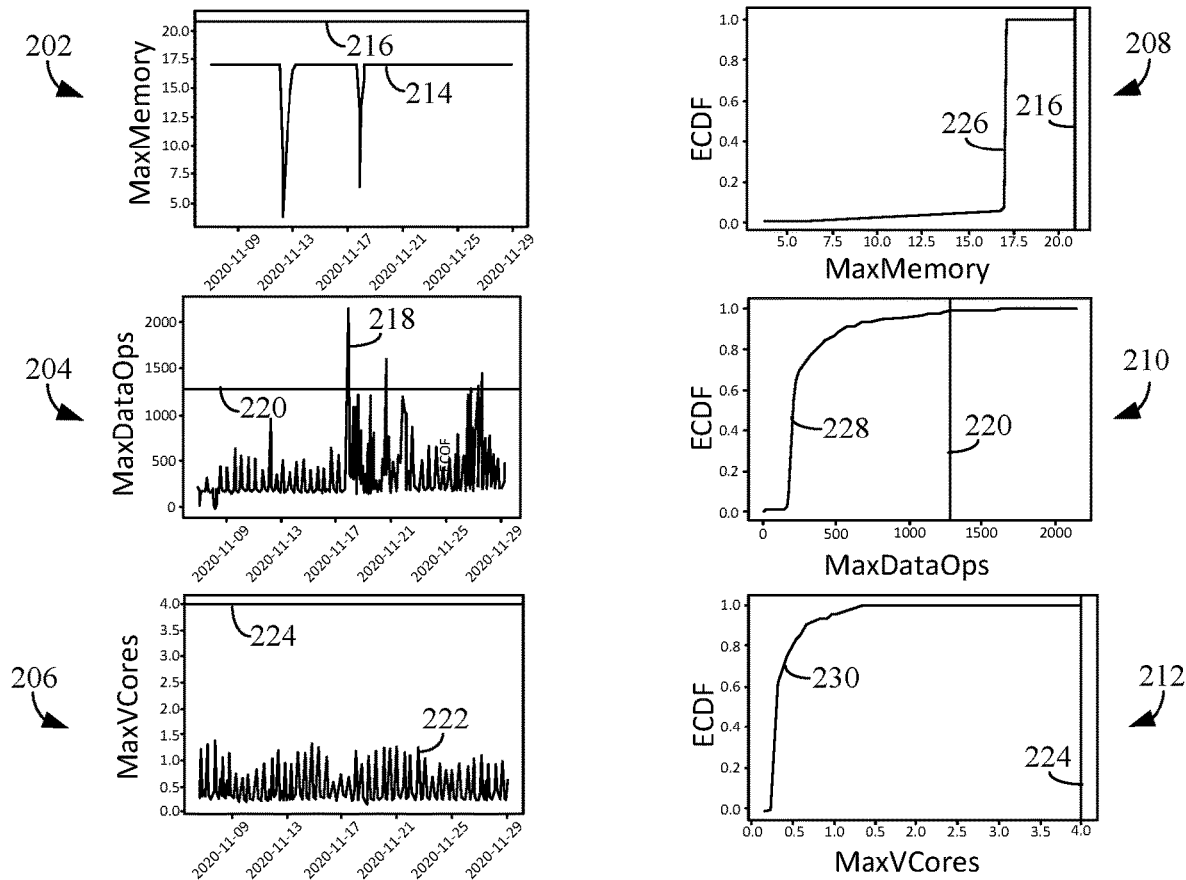
FIG. 2 depicts graphs comprising a plurality of time series in accordance with example embodiments.

For instance, FIG. 2 depicts graphs 202, 204, 206, 208, 210, and 212 in accordance with example embodiments. Graphs 202, 204, 206, 208, 210, and 212 are generated with respect to a particular compute resource configuration. In the example shown in FIG. 2, the configuration for a particular compute resource comprises 4 processing cores, supports 20.8 gigabytes (GB) of memory, and supports 1280 IOPs. Graph 202 depicts a time series 214 representative of a particular customer's resource memory usage on an on-premise device (e.g., computing device 102) during execution of application 110 over the course of 20 days. Line 216 represents that maximum memory (i.e., 20.8 GB) supported by the compute resource configuration. Graph 204 depicts a time series 218 representative of the IOPs of computing device 102 during execution of application 110 over the course of 20 days. Line 220 represents that maximum IOPs (i.e., 1280) supported by the compute resource configuration. Graph 206 depicts a time series 222 representative of the CPU core usage of computing device 102 during execution of application 110 over the course of 20 days. Line 224 represents the maximum cores (i.e., 4) supported by the compute resource configuration.

Statistics modeler 114 is configured to generate a distribution function (e.g., an empirical cumulative distribution function (ECDF)) for each time series 214, 218, and 222, but without the time dimension. For instance, as shown in FIG. 2, statistics modeler 114 generates a distribution function of all the values that exist in time series 214, but without the time component. The foregoing results in a curve 226 in graph 208, where the y-axis represents the distribution function, and the x-axis represents the memory usage. Line 216 in graph 208 represents that maximum memory (i.e., 20.8 GB) supported by the compute resource configuration. Graph 208 represents the probability that the particular compute resource fulfills the customer's performance needs with respect to memory usage (as measured via agent 108). In the example shown in graph 208, the memory usage is always less than or equal to the maximum supported memory. Accordingly, the determined probability is 1 (i.e., this particular compute resource configuration will always fulfill the customer's performance needs with respect to memory usage).

In another example, statistics modeler 114 generates a distribution function of all the values that exist in time series 218, which results in curve 228 in graph 210, where the y-axis represents the distribution function, and the x-axis represents the IOPs. As shown in graph 210, line 220 represents that maximum IOPs (i.e., 1280) supported by the compute resource configuration. Graph 210 represents the probability that the particular compute resource fulfills the customer's performance needs with respect to IOPs (as measured via agent 108). In the example shown in graph 210, the probability is approximately 0.986.

In yet another example, statistics modeler 114 generates a distribution function of all the values that exist in time series 224, which results in curve 230 in graph 212, where the y-axis represents the distribution function, and the x-axis represents the CPU core usage. As shown in graph 212, line 224 represents the maximum CPU cores (i.e., 4) supported by the compute resource configuration. Graph 212 represents the probability that the particular compute resource fulfills the customer's performance needs with respect to CPU core usage (as measured via agent 108). In the example shown in graph 212, the probability is 1 (i.e., this particular compute resource configuration will always fulfill the customer's performance needs with respect to CPU core usage).

Statistics modeler 114 performs the foregoing operations for each metric profiled via agent 108 and for each available compute resource configuration. Price-to-performance modeler 116 is configured to generate a nonparametric joint distribution by analyzing at what frequency each metric is fulfilled for a given compute resource configuration. For instance, price-to-performance modeler 116 generates a score for each compute resource configuration available for data migration that represents the probability of fulfilling the customer's performance needs based on all profiled metrics. The score (also referred to herein as a one minus throttling probability value) may be defined in accordance with Equation 1, which is shown below:

$$\text{Score}(Sku_i) = P(r_{CPU} \leq R_{CPU, Sku_i}, r_{RAM} \leq R_{RAM, Sku_i}, r_{IOPS} \leq R_{IOPS, Sku_i}, \dots) \quad \text{(Equation 1)}$$

$r_{\{CPU, RAM, IOPS, \dots\}}$ is a random variable representing the usage for a particular resource {CPU, RAM, IOPs, log rate, data size, latency, etc.}. This is obtained via agent 108, as described above. $R_{*,Sku_i}$ represents the fixed capacity of a particular resource {CPU, RAM, IOPS, . . . } for a particular compute resource configuration Sku$_i$. This is obtained via configurations 118. The throttling probability value represents a likelihood that an application requires throttling when executed on a particular cloud-based compute resource configuration. The one minus throttling probability value represents a likelihood that an application does not require throttling when executed on a particular cloud-based compute resource configuration. As used herein, the term throttling refers to limiting the performance and/or functionality of an application, for example, by limiting the number of requests that may be issued by the application.

In accordance with Equation 1, the score is calculated by identifying all the relevant compute resource configurations that a customer can migrate their workloads towards (represented as Sku$_i$) to, identifying all the relevant specification values associated with each of these compute resource configurations (e.g., the CPU, RAM, IOPs, latency limits, etc.), and calculating the (non-parametric) joint probability that the current customer's utilization in each of these dimensions will be fulfilled given each compute resource configuration. In other words, price-to-performance modeler 116 generates a score as to how well each compute resource configuration is able to fulfill the customers' performance needs based on all the performance dimensions listed above. Price-to-performance modeler 116 may utilize the cost associated with each compute resource configuration to generate a price-to-performance curve. Thus, not only does price-to-performance modeler 116 rank the relevant compute resource configurations via the throttling probability metric, but also by their respective costs. The costs for each available compute resource configuration may be included in billing costs 120. Billing costs 120 may comprise a data structure or file that stores the costs for each available compute resource configuration that is available for data migration. In accordance with an embodiment, the costs may comprise the monthly cost incurred by the customer for each of the compute resource configurations, although the embodiments described herein are not so limited.

Figure 3:
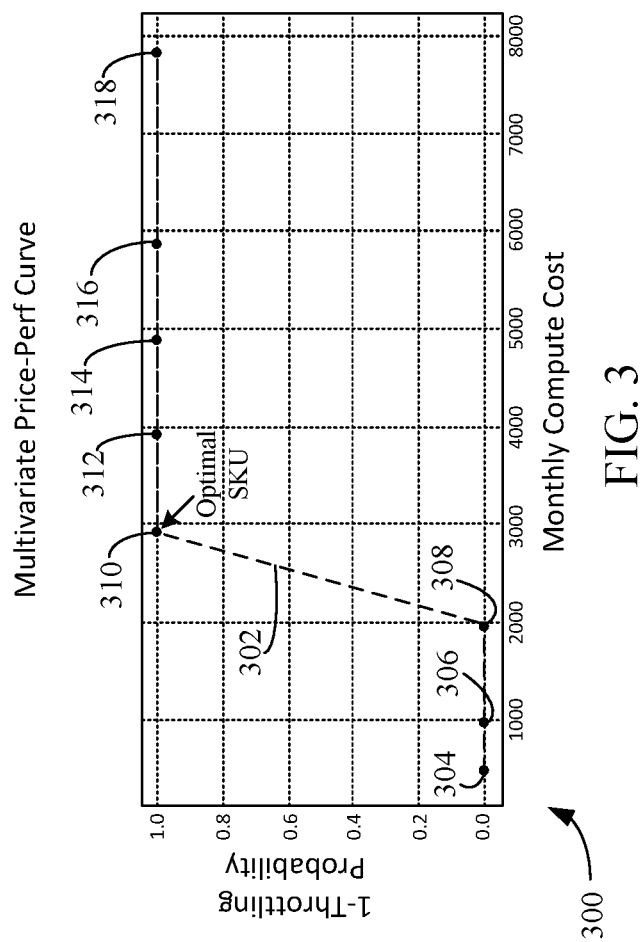
FIG. 3 depicts a price-to-performance curve in accordance with an example embodiment.

For example, FIG. 3 depicts a graph 300 of a price-to-performance curve 302 in accordance with an example embodiment. As shown in FIG. 3, the x-axis of graph 300 is the monthly cost to a customer with respect to different compute resource configurations 304, 306, 308, 310, 312, 314, 316, and 318. The y-axis of graph 300 is represents one minus the throttling probability, as determined in accordance with Equation 1 described above. Price-to-performance modeler 116 determines curve 302 by enumerating over the scores determined for all available compute resource configurations (e.g., compute resource configurations 304, 306, 308, 310, 312, 314, 316, and 318). That is, price-to-performance modeler 116 determines the scores for each compute resource configuration (in accordance with Equation 1), determines the cost for each compute resource configuration, and may generate a plot based on the determined scores and cost.

Price-to-performance modeler 116 is configured to generate curve 302 such that is monotonically non-decreasing (or increasing). For instance, price-to-performance modeler 116 may be configured to filter out certain compute resource configurations that would cause curve 302 to be not monotonically increasing. That is, price-to-performance modeler 116 causes curve 302 to comprise values that only increase or remain constant (when compared to prior values) and not comprise values that decrease (when compared to prior values).

Price-to-performance modeler 116 is configured to recommend an optimal compute resource configuration to the user based on price-to-performance curve 302. For instance, price-to-performance modeler 116 selects the cheapest compute resource configuration that is closest to having a one minus throttling probability value having a value of 1. For example, as shown in FIG. 3, compute resource configurations 310, 312, 314, 316, and 318 each have a one minus throttling probability value of 1. The compute resource configuration of compute resource configurations 310, 312, 314, 316, and 318 having the lowest cost is selected and recommended to the user. In the example shown in FIG. 3, compute resource configuration 310 is determined to be the optimal compute resource configuration and is recommended to the user. For example, as shown in FIG. 1, price-to-performance modeler 116 provides a recommendation 122 to computing device 102 via network(s) 106.

In accordance with an embodiment, a compute resource configuration may be recommended based on other customer profiles. For instance, price-to-performance modeler 116 may be configured to compare the customer's price-to-performance curve to price-to-performance curves generated for other cloud customer profiles (i.e., customers that have already migrated their data to the cloud). The foregoing may be achieved by identifying a possible preference, of each of the other customers, of the price-to-performance trade-offs based on customer segmentation according to their respective usage patterns and selecting the optimal compute resource configuration from the customer's price-to-performance curve. Because there could be several compute resource configurations to choose from, in each personalized ranking, the customer's behavior is profiled to match it to current cloud customers to identify which set of customers it best aligns with.

By identifying the group of cloud customers that this particular customer matches best with, the customer can be guided towards one recommendation on their unique price-to-performance curve. Price-to-performance modeler 116 guides the customer based on an understanding how the cloud customers have chosen their respective compute resource configurations based on their own respective price-to-performance curves (e.g., on average, cloud customers might choose configurations that satisfy only 80% of their utilization needs since they tend to negotiate on certain resources, such as memory and IOPs).

As shown in FIG. 1, price-to-performance modeler 116 may also be configured to receive cloud customer data 124. Cloud customer data 124 may comprise a plurality of time series obtained with respect to a plurality of metrics for different cloud customers, after the customers have migrated their data to the cloud. For each cloud customer, price-toperformance modeler 116 determines whether any of the metrics profiled therefor are negotiable, meaning that a particular metric is not required to be fulfilled 100 percent of the time by a particular compute resource configuration. If for a particular metric, the peak period (a time period in which maximum utilization of the metric) accounts for more than 1 percent of the time, price-to-performance modeler 116 determines that this metric is not negotiable.

Figure 4:
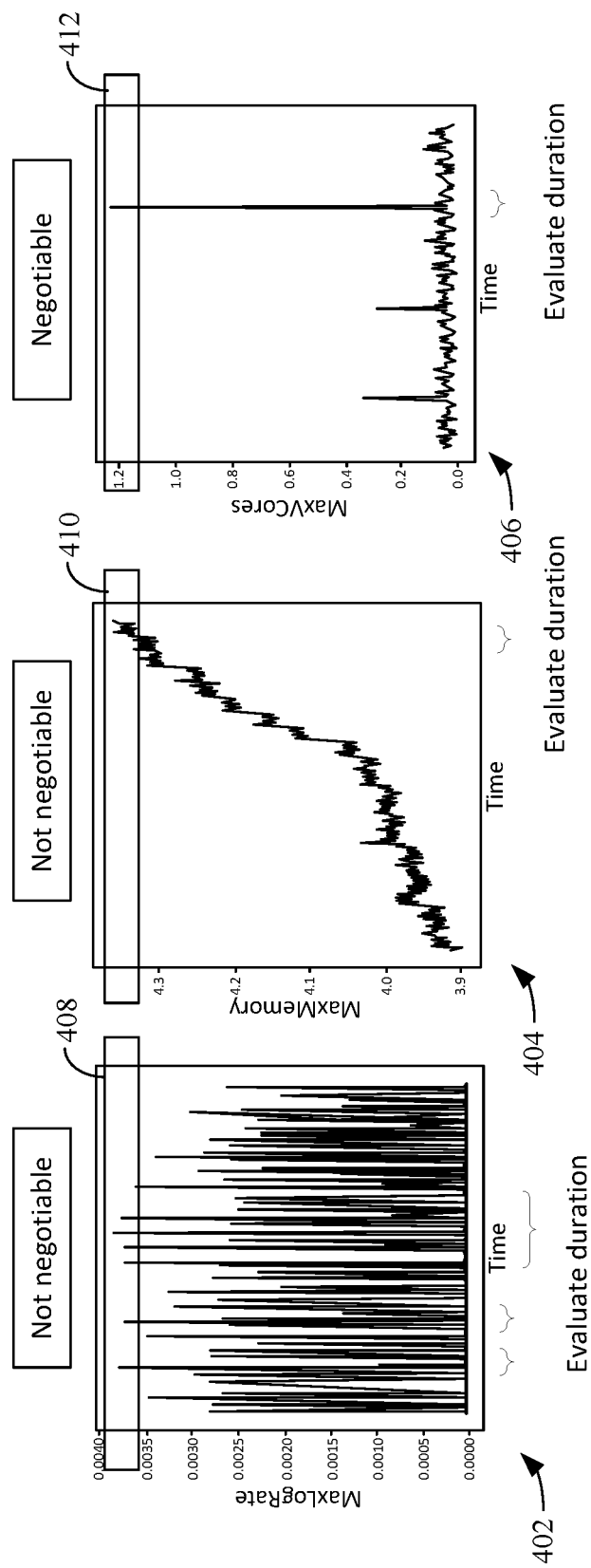
FIG. 4 depicts graphs comprising a plurality of time series in accordance with other example embodiments.

For instance, FIG. 4 depicts graphs 402, 404, and 406. Graph 402 represents a time series for the log rate metric collected for a particular cloud customer after that customer has migrated to the cloud. Graph 404 represents a time series for the memory usage metric for the cloud customer. Graph 406 represents a time series for the CPU core metric for the cloud metric. For each of graphs 402, 404, and 406, price-to-performance modeler 116 identifies the maximum peak in the time series. Price-to-performance modeler 116 utilizes a standard error or approximate standard deviation to capture the variance with respect to the maximum peak. The foregoing operations result in a window of values that are determined for each of graphs 402, 404, and 406. For example, as shown in FIG. 4, window 408 is determined for the time series in graph 402, window 410 is determined for the time series in graph 404, and window 412 is determined for the time series in graph 406.

For each of windows 408, 410, and 412, price-to-performance modeler 116 calculates the duration of time the corresponding metric landed within that window. If the duration is greater than a threshold (e.g., 1 percent), then price-to-performance modeler 116 determines that that metric is not negotiable. In the examples shown in FIG. 4, the log rate and memory usage are determined to be non-negotiable, as the duration in which such metrics were in respective windows 408 and 410 was greater than the threshold. In contrast, the CPU core metric is determined to be negotiable, as the duration in which this metric was in window 412 was less than the threshold. In accordance with an embodiment, the threshold is predetermined. In accordance with another embodiment, the threshold is automatically determined using machine-learning based techniques.

Based on the foregoing negotiability analysis, price-to-performance modeler 116 groups each cloud customer into one of $2^N$ groups, where N represents the number metrics for which negotiability is determined. Each group corresponds to a particular combination of negotiability for the N metrics. For example, in an embodiment in which N equals 4, and the 4 metrics are CPU cores, memory usage, IOPs, and log rate, one group may be representative of customers in which CPU cores is negotiable, memory usage is non-negotiable, IOPs are negotiable, and log rate is not negotiable. In another example, another group may be representative of cloud customers in which CPU cores is non-negotiable, memory usage is negotiable, IOPs are non-negotiable, and log rate is non-negotiable.

Price-to-performance modeler 116 also analyzes time series data 112 received for the customer wanting to migrate to the cloud and analyzes the time series for each metric in a similar fashion to determine whether any such metrics are negotiable. After determining which metrics are negotiable for the user, price-to-performance modeler 116 associates the customer with a customer group of the plurality of groups described above having the same combination of negotiability.

Price-to-performance modeler 116 is further configured to determine the price-to-performance curves for each of the cloud customers within that group (in a similar manner as described above) and determines the one minus throttling probability value determined for each of the customers. Price-to-performance modeler 116 combines the one minus throttling probability value for each of the cloud customers in the group and associates the combined probability with the customer wanting to migrate to the cloud. For instance, price-to-performance modeler 116 may average each of the one-minus throttling probability values and associates the resulting value with the customer. Price-to-performance modeler 116 then determines a compute resource configuration on the customer's price-to-performance curve having a one minus throttling probability value that is closest to the combined probability. The determined compute resource configuration is then recommended to the user. For instance, price-to-performance modeler 116 may provide recommendation 122 to computing device 102 via network(s) 106.

Figure 5:
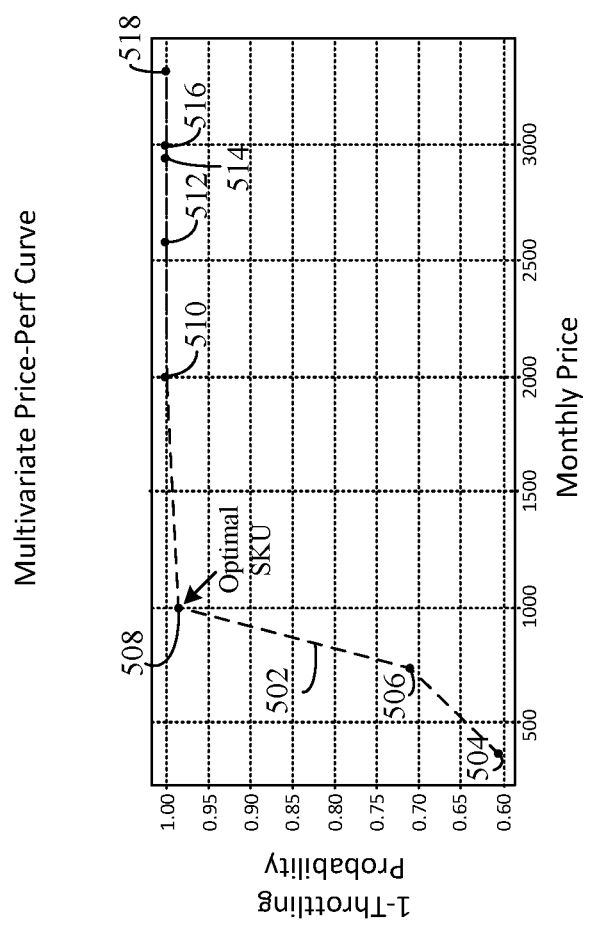
FIG. 5 depicts a graph of a price-to-performance curve in accordance with another example embodiment.

For example, FIG. 5 depicts a graph 500 of a price-to-performance curve 502 in accordance with another example embodiment. As shown in FIG. 5, the x-axis of graph 500 is the monthly cost to a customer with respect to different compute resource configurations 504, 506, 508, 510, 512, 514, 516, and 518. The y-axis of graph 500 represents one minus the throttling probability, as determined in accordance with Equation 1 described above. Price-to-performance modeler 116 determines curve 502 in accordance with the embodiments described above.

In the example shown in FIG. 5, price-to-performance modeler 116 may determine that customers having a similar price-to-performance curve select a SKU associated with an average one minus throttling probability value of 0.96. Accordingly, price-to-performance modeler 116 determines that compute resource configuration 508 is the most optimal for the customer migrating to the cloud. While compute resource configurations 510, 512, 514, 516, and 518 have higher one minus throttling probability values, compute resource configuration 508 is selected for recommendation based on the negotiability and customer group analysis described above.

Recommendation 122 may be presented to the user via a graphical user interface. The graphical user interface may be associated with a portal associated with the cloud services platform to which the customer intends to migrate. The recommendation may specify the determined compute resource configuration and further specify the percentage of the customer's current utilization that the determined compute resource configuration satisfies. Recommendation 122 may further specify an alternative recommendation that recommends a compute resource configuration that satisfies 100 percent of the customer's utilization with a caveat that such a configuration is more costly.

Using the portal, the user may select one of the recommended compute resource configurations. Upon selection, the selected compute resource configuration is allocated for the user and is utilized for the user upon the user's applications (e.g., application 118) and/or data being deployed and/or migrated to the cloud.

Figure 6:
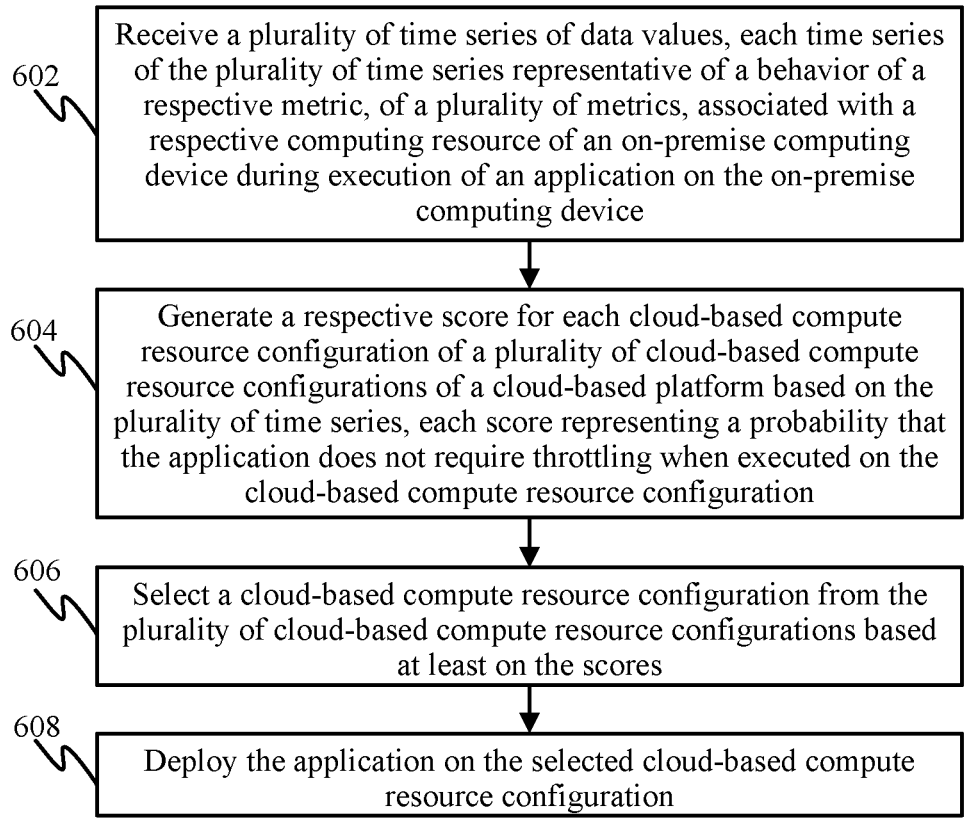
FIG. 6 depicts a flowchart of an example method for determining a cloud-based compute resource configuration to which an application may be migrated in accordance with an example embodiment.

Accordingly, a cloud-based compute resource configuration may be determined for a user for application migration in various ways. For example, FIG. 6 depicts a flowchart 600 of an example method for determining a cloud-based compute resource configuration to which an application may be migrated in accordance with an example embodiment. In an embodiment, flowchart 600 may be implemented by system 100 of FIG. 1. Accordingly, the method of flowchart 600 will be described with continued reference to system 100 of FIG. 1, although the method is not limited to that implementation. Other structural and operational embodiments will be apparent to persons skilled in the relevant art(s) based on the discussion regarding flowchart 600 and system 100 of FIG. 1.

As shown in FIG. 6, the method of flowchart 600 begins at step 602. At step 602, a plurality of time series of data series is received. Each time series of the plurality of time series are representative of a behavior of a metric, of a plurality of metrics, associated with a respective computing resource of an on-premise computing device during execution of an application on the on-premise computing device. For example, with reference to FIG. 1, configuration recommender 104 obtains time series data 112, which comprises a plurality of time series each representative of a behavior of a metric associated with a respective computing resource of computing device 102. Computing device 102 is an on-premise computing device that is located and/or maintained on the premise of the user that desires to migrate application 110 to a cloud-based compute resource configuration. The metric behavior is observed during execution of application 110.

At step 604, a respective score for each cloud-based compute resource configuration of a plurality of cloud-based compute resource configurations of a cloud-based platform is generated based on the plurality of time series. Each score represents a probability that the application does not require throttling when executed on the cloud-based compute resource configuration. For example, with reference to FIG. 1, configuration recommender 104 generates a respective score for a plurality of different cloud-based compute resource configurations based on time series data 112. Additional details regarding generating the score for a cloud-based compute resource configuration is described below with reference to FIGS. 7 and 8.

In accordance with one or more embodiments, each cloud-based configuration of the plurality of cloud-based compute resource configuration comprises at least one of a number of central processing unit cores maintained by a respective cloud-based compute resource, an amount of storage maintained by the respective cloud-based compute resource, an amount to memory maintained by the respective cloud-based compute resource, or a number of input/output operations per second supported by the respective cloud-based compute resource.

In accordance with one or more embodiments, the respective cloud-based compute resource comprises at least one of a server maintained by the cloud-based platform or a virtual machine maintained by the cloud-based platform.

At step 606, a cloud-based compute resource configuration from the plurality of different cloud-based compute resource configurations is selected based at least on the scores. For example, with reference to FIG. 1, configuration recommender 104 selects a cloud-based compute resource configuration from the plurality of different cloud-based compute resource configurated based at least on the scores.

At step 608, the application is deployed on the selected cloud-based compute resource configuration. For example, with reference to FIG. 1, configuration recommender 104 deploys application 110 on the selected cloud-based compute resource configuration.

Figure 7:
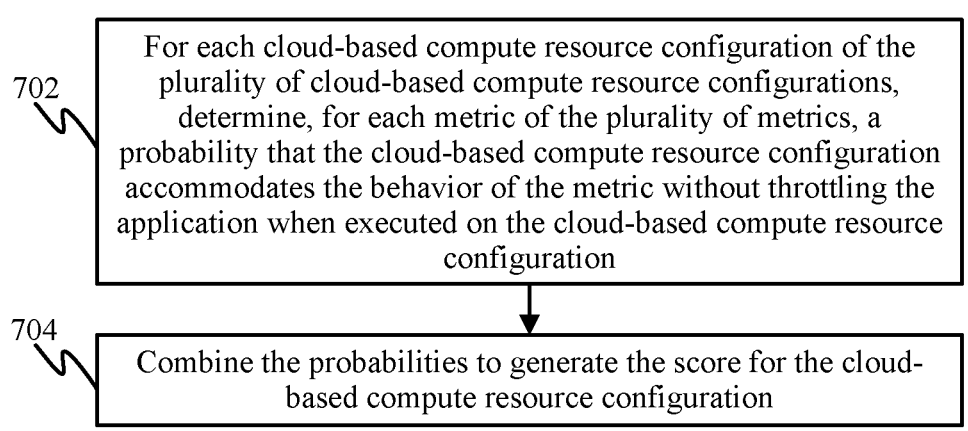
FIG. 7 depicts a flowchart of an example method for generating a score for a cloud-based compute resource configuration in accordance with an example embodiment.

FIG. 7 depicts a flowchart 700 of an example method for generating a score for a cloud-based compute resource configuration in accordance with an example embodiment. In an embodiment, flowchart 700 may be implemented by system 100 of FIG. 1.

Accordingly, the method of flowchart 700 will be described with continued reference to system 100 of FIG. 1, although the method is not limited to that implementation. Other structural and operational embodiments will be apparent to persons skilled in the relevant art(s) based on the discussion regarding flowchart 700 and system 100 of FIG. 1.

As shown in FIG. 7, the method of flowchart 700 begins at step 702. At step 702, for each cloud-based compute resource configuration of the plurality of cloud-based compute resource configurations and, for each metric of the plurality of metrics, a probability that the cloud-based compute resource configuration accommodates the behavior of the metric without throttling the application when executed on the cloud-based compute resource configuration is determined. For example, with reference to FIG. 1, statistics modeler 114 of configuration recommender 104 determines, for each cloud-based compute resource configuration of configurations 118 and, for each metric of the plurality of metrics, a probability that the cloud-based compute resource configuration accommodates the behavior of the metric without throttling application 110 when executed on the cloud-based compute resource configuration.

At step 704, the probabilities are combined to generate the score for the cloud-based compute resource configuration. The score is representative of a multivariate probability. For example, with reference to FIG. 1, the probabilities determined by statistics modeler 114 are provided to price-to-performance modeler 116. Price-to-performance modeler 116 combines the probabilities determined for a particular cloud-based compute resource configuration to generate a score for the cloud-based compute resource configuration. Price-to-performance modeler 116 may combine the probabilities in accordance with Equation 1, as described above.

Figure 8:
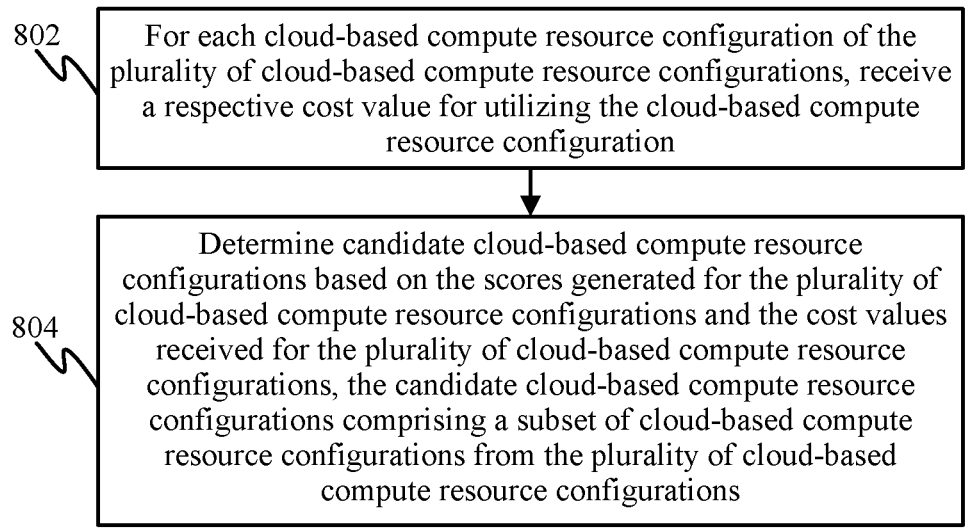
FIG. 8 depicts a flowchart of an example method for determining candidate cloud-based compute resource configurations for migration in accordance with an example embodiment.

FIG. 8 depicts a flowchart 800 of an example method for determining candidate cloud-based compute resource configurations for migration in accordance with an example embodiment. In an embodiment, flowchart 800 may be implemented by system 100 of FIG. 1. Accordingly, the method of flowchart 800 will be described with continued reference to system 100 of FIG. 1, although the method is not limited to that implementation. Other structural and operational embodiments will be apparent to persons skilled in the relevant art(s) based on the discussion regarding flowchart 800 and system 100 of FIG. 1.

As shown in FIG. 8, the method of flowchart 800 begins at step 802. At step 802, for each cloud-based compute resource configuration of the plurality of cloud-based compute resource configurations, a respective cost value for utilizing the cloud-based compute resource configuration is received. For example, with reference to FIG. 1, price-to-performance modeler 116 receives, for each cloud-based resource configuration of configurations 118, a respective cost value (e.g., billing costs 120) for utilizing the cloud-based compute resource configuration.

At step 804, candidate cloud-based compute resource configurations are determined based on the scores generated for the plurality of cloud-based compute resource configurations and the cost values received for the plurality of cloud-based compute resource configurations. The candidate cloud-based compute resource configurations comprise a subset of cloud-based compute resource compute configurations from the plurality of cloud-based compute resource configurations. For example, with reference to FIG. 1, price-to-performance modeler 116 determines candidate cloud-based compute resource configurations based on the scores generated for configurations 118 and billing costs 120. For instance, price-to-performance modeler 116 may generate a price-to-performance curve (e.g., price-to-performance curve 302, as described above with reference to FIG.

3). The price-to-performance curve may comprise various data points, where each data point corresponds to a candidate cloud-based compute resource configuration.

Figure 9:
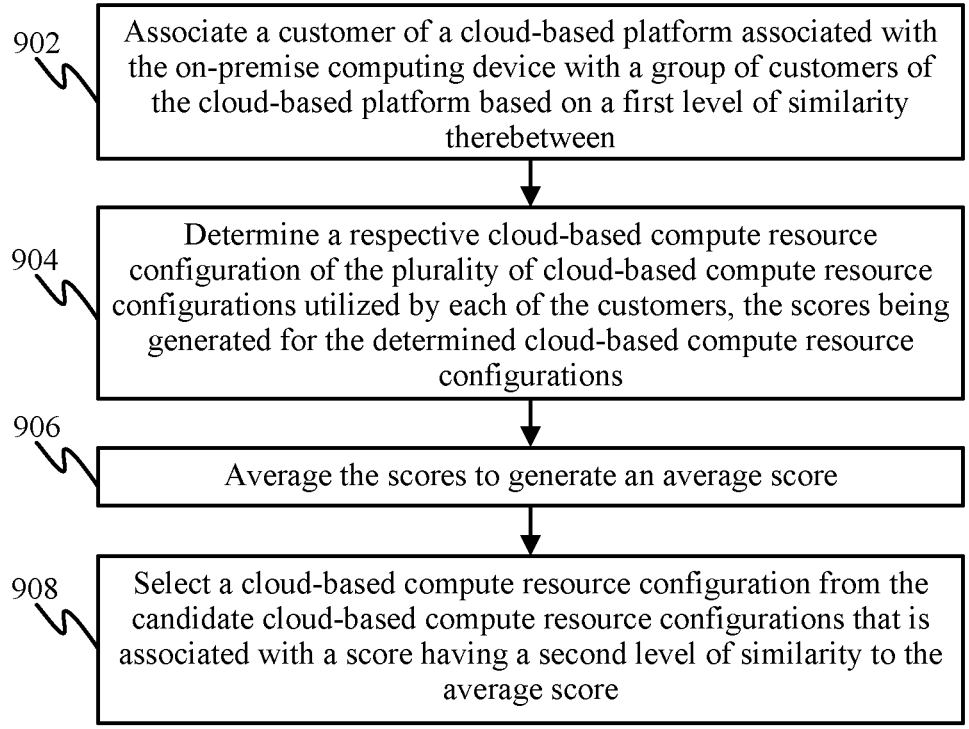
FIG. 9 depicts a flowchart of an example method for determining candidate cloud-based compute resource configurations based on cloud-based compute resource configurations utilized by cloud-based platform customers in accordance with an example embodiment.

In accordance with one or more embodiments, candidate cloud-based resource configurations may be determined based on cloud-based resource configurations utilized by current customers of the cloud-based platform. For example, FIG. 9 depicts a flowchart 900 of an example method for determining candidate cloud-based compute resource configurations based on cloud-based compute resource configurations utilized by cloud-based platform customers in accordance with an example embodiment. In an embodiment, flowchart 900 may be implemented by system 100 of FIG. 1. Accordingly, the method of flowchart 900 will be described with continued reference to system 100 of FIG. 1, although the method is not limited to that implementation. Other structural and operational embodiments will be apparent to persons skilled in the relevant art(s) based on the discussion regarding flowchart 900 and system 100 of FIG. 1.

As shown in FIG. 9, the method of flowchart 900 begins at step 902. At step 902, a customer of a cloud-based platform associated with the on-premise computing device is associated with a group of customers of the cloud-based platform based on a first level of similarity therebetween. For example, with reference to FIG. 1, price-to-performance modeler 116 analyzes cloud customer data 124 to determine a group of customers of the cloud-based platform that has a level of similarity to the customer associated with computing device 102. For example, as described above, price-to-performance modeler 116 may group each cloud customer into one of 2^N groups, where N represents the number metrics for which negotiability is determined. Each group corresponds to a particular combination of negotiability for the N metrics. Price-to-performance modeler 116 also analyzes time series data 112 received for the customer wanting to migrate to the cloud and analyzes the time series for each metric to determine whether any such metrics are negotiable. After determining which metrics are negotiable for the user, price-to-performance modeler 116 associates the customer with a customer group of the plurality of groups described above having the same combination of negotiability.

At step 904, a respective cloud-based compute resource configuration of the plurality of cloud-based compute resource configurations utilized by each of the customers is determined. The scores are generated for the determined cloud-based compute resource configurations. For example, with reference to FIG. 1, price-to-performance modeler 116 determines a respective cloud-based compute resource configuration of the plurality of cloud-based compute resource configurations utilized by each of the customers and generates the scores for each determined cloud-based compute resource configuration. For instance, price-to-performance modeler 116 is configured to determine the price-to-performance curves for the cloud customers within that group and determines the one minus throttling probability value determined for each of the customers (e.g., in accordance with Equation 1, as described above).

At step 906, the scores are averaged to generate an average score. For example, with reference to FIG. 1, price-to-performance modeler 116 combines the one minus throttling probability value for each of the cloud customers in the group and associates the combined probability with the customer wanting to migrate to the cloud. For instance, price-to-performance modeler 116 may average each of the one-minus throttling probability values and associates the resulting value with the customer.

At step 908, a cloud-based compute resource configuration from the candidate cloud-based compute resource configurations that is associated with a score having a second level of similarity to the average score is selected. For example, with reference to FIG. 1, price-to-performance modeler 116 selects a cloud-based compute resource configuration from the candidate cloud-based compute resource configurations that is associated with a score having a second level of similarity to the average score. For instance, price-to-performance modeler 116 determines a compute resource configuration on the customer's price-to-performance curve having a one minus throttling probability value that is closest to the combined probability. As shown in FIG. 5, price-to-performance modeler 116 may select configuration 508 from price-to-performance curve 502 generated for the customer. The determined cloud-based compute resource configuration is then recommended to the user. Additional details for recommending the determined cloud-based compute resource configuration are described below with reference to FIG. 10.

Figure 10:
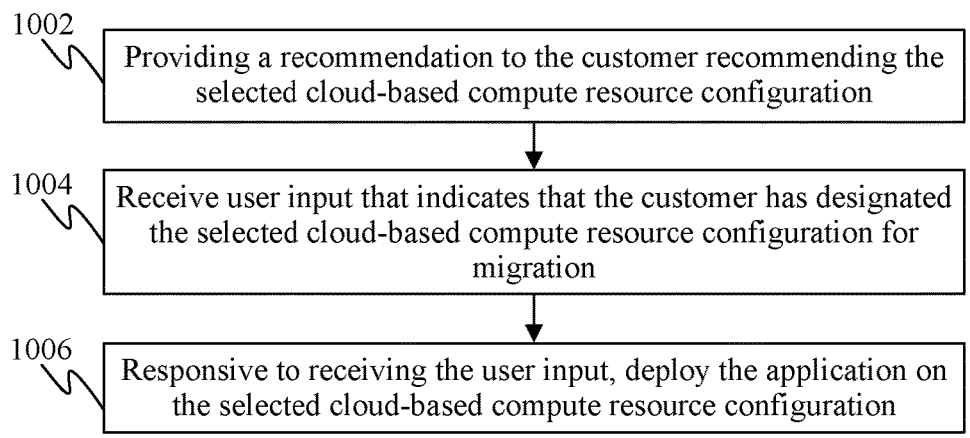
FIG. 10 depicts a flowchart of an example method for recommending a candidate cloud-based compute resource configuration to a user in accordance with an example embodiment.
Figure 11:
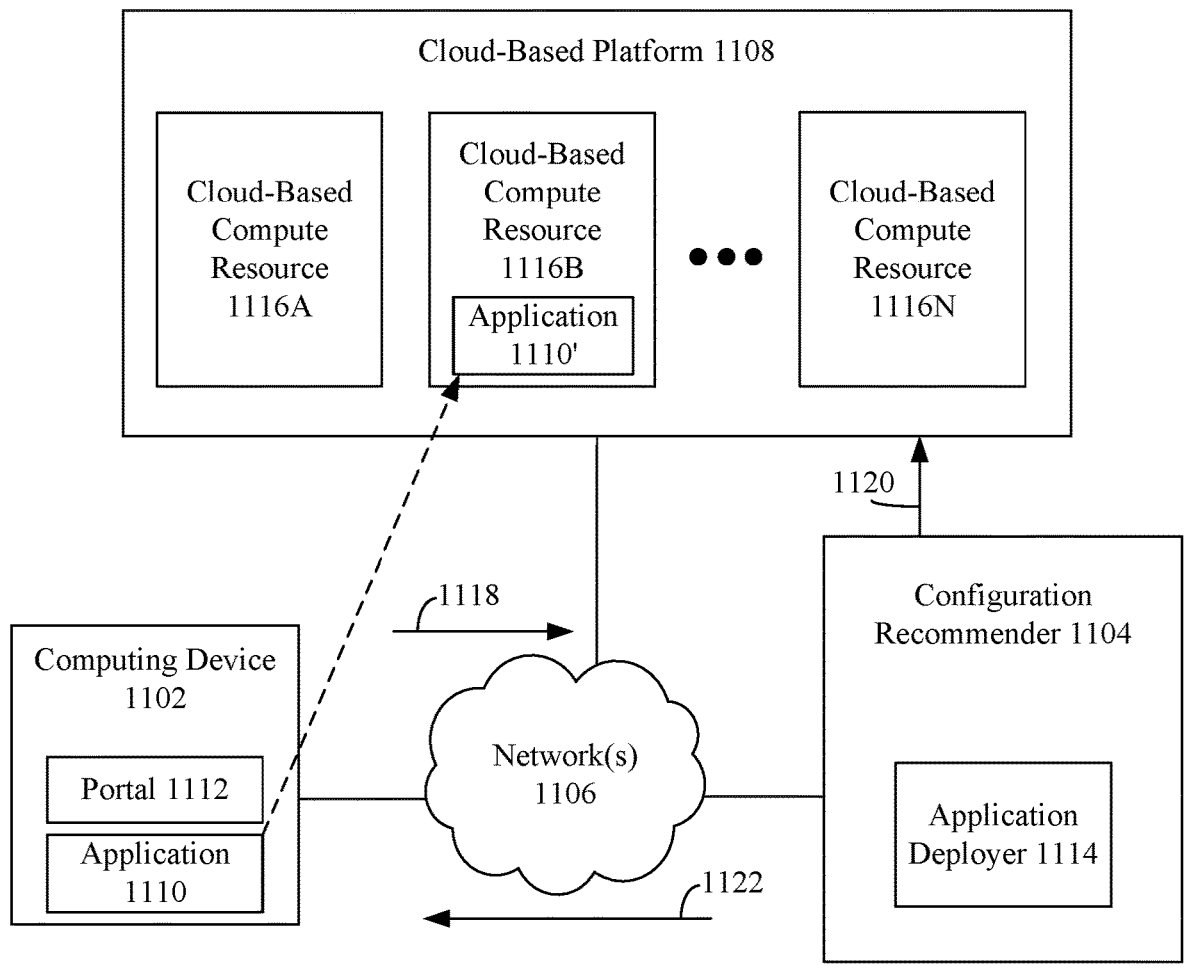
FIG. 11 depicts a block a diagram of a system for recommending a cloud-based compute resource configuration and deploying an application thereon in accordance with an example embodiment.

FIG. 10 depicts a flowchart 1000 of an example method for recommending a candidate cloud-based compute resource configuration to a user in accordance with an example embodiment. In an embodiment, flowchart 1000 may be implemented by a system 1100 of FIG. 11. FIG. 11 depicts a block a diagram of a system 1100 for recommending a cloud-based compute resource configuration and deploying an application thereon in accordance with an example embodiment. As shown in FIG. 11, system 1100 comprises a computing device 1102, a configuration recommender 104, and a cloud-based platform 1108. Computing device 1102 and configuration recommender 1104 are examples of computing device 102 and configuration recommender 104, as described above with reference to FIG. 1. Computing device 1102, configuration recommender 1014, and cloud-based platform 1108 are communicatively coupled via network(s) 1106, which is an example of network(s) 106, as described above with reference to FIG. 1. In accordance with at least one embodiment, cloud-based platform 1108 comprises part of the Microsoft® Azure® cloud computing platform, owned by Microsoft Corporation of Redmond, Washington, although this is only an example and not intended to be limiting. While not extensively shown or described for brevity and illustrative clarity, cloud-based platform 1108 may comprise any number and/or type of internal communication links and/or computing/routing hardware that connect computing devices and hosts/servers, etc., such as, but not limited to, wired or wireless networks and portions thereof, point-to-point connections, routers, switches, and/or the like. As shown in FIG. 11, cloud-based platform 1108 comprises a plurality of cloud-based compute resources 1116A-1116N. Each of cloud-based compute resources 1116A-1116N comprises a server (or "node") or a virtual machine instantiated on a server. As further shown, configuration recommender 1104 comprises an application deployer 1114, and computing device 1102 comprises an application 1110 and is communicatively coupled to a portal 1112. Application 1110 is an example of application 110, as described above with FIG. 1. Portal 1112 may comprise a user interface by which a customer may access and/or manage cloud-based compute resource configuration(s) 1116A-1116N and deploy applications to compute resource configuration(s) 1116A-1116N. Portal 1112 may be accessible via a browser application executing on computing device 1102. An example of portal 1112 includes, but is not limited to, Microsoft® Azure® Portal published by Microsoft® Corporation. In certain embodiments, configuration recommender 1104 is incorporated within cloud-based platform 1108. For instance, configuration recommender 1104 may comprise a service that is offered by cloud-based platform 1108. Accordingly, the method of flowchart 1100 will be described with continued reference to system 1100 of FIG. 11, although the method is not limited to that implementation. Other structural and operational embodiments will be apparent to persons skilled in the relevant art(s) based on the discussion regarding flowchart 1000 and system 1100 of FIG. 11.

As shown in FIG. 10, the method of flowchart 1000 begins at step 1002. At step 1002, a recommendation is provided to the customer recommending the selected cloud-based compute resource configuration. For example, with reference to FIG. 11, configuration recommender 1104 may provide a recommendation 1122 to computing device 1102 via network(s) 1106. Recommendation 1122 is an example of recommendation 122, as described above with reference to FIG. 1. Recommendation 1122 may be displayed via portal 1112.

At step 1004, user input that indicates that the customer has designated the selected cloud-based compute resource configuration for migration is received. For example, with reference to FIG. 11, the customer may provide input via portal 1112 that indicates that the customer has designated the selected cloud-based compute resource configuration (e.g., cloud-based compute resource configuration 1116B). For instance, the user may select a user interface element (e.g., a button) displayed via portal 1112 that, when activated, indicates that the customer has designated the selected cloud-based compute resource configuration for migration. Responsive to selecting the user interface element, portal 1112 may provide an indication 1118 to configuration recommender 1104 via network(s) 1106.

At step 1006, responsive to receiving the user input, the application is deployed on the selected cloud-based compute resource configuration. For example, with reference to FIG. 11, responsive to receiving indication 1118, application deployer 1114 deploys application 1110 to the selected cloud-based compute resource configuration (e.g., cloud-based compute resource 1116B). As shown in FIG. 11, application deployer 1114 provides a command 1120 to cloud-based platform 1108 that causes cloud-based platform 1108 to deploy application 1110 on the selected cloud-based compute resource (e.g., cloud-based compute resource 1116B). As shown in FIG. 11, cloud-based compute resource 1116B is depicted as executing application 1110 (shown as application 1110') post-migration.

III. Example Computer System Implementation

The systems and methods described above in reference to FIGS. 1-11, may be implemented in hardware, or hardware combined with one or both of software and/or firmware. For example, system 1200 of FIG. 12 may be used to implement any of computing device 102, agent 108, application 110, configuration recommender 104, statistics modeler 114, price-to-performance modeler 116, computing device 1102, configuration recommender 1104, application deployer 1114, cloud-based compute resources 1116A-1116N, and/or any of the components respectively described therein, and flowcharts 600, 700, 800, 900, and/or 1000 may be each implemented as computer program code/instructions configured to be executed in one or more processors and stored in a computer readable storage medium. Alternatively, any of computing device 102, agent 108, application 110, configuration recommender 104, statistics modeler 114, price-to-performance modeler 116, computing device 1102, configuration recommender 1104, application deployer 1114, cloud-based compute resources 1116A-1116N, and/or any of the components respectively described therein, and flowcharts 600, 700, 800, 900, and/or 1000 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions. The description of system 1200 provided herein is provided for purposes of illustration, and is not intended to be limiting. Embodiments may be implemented in further types of computer systems, as would be known to persons skilled in the relevant art(s).

Figure 12:
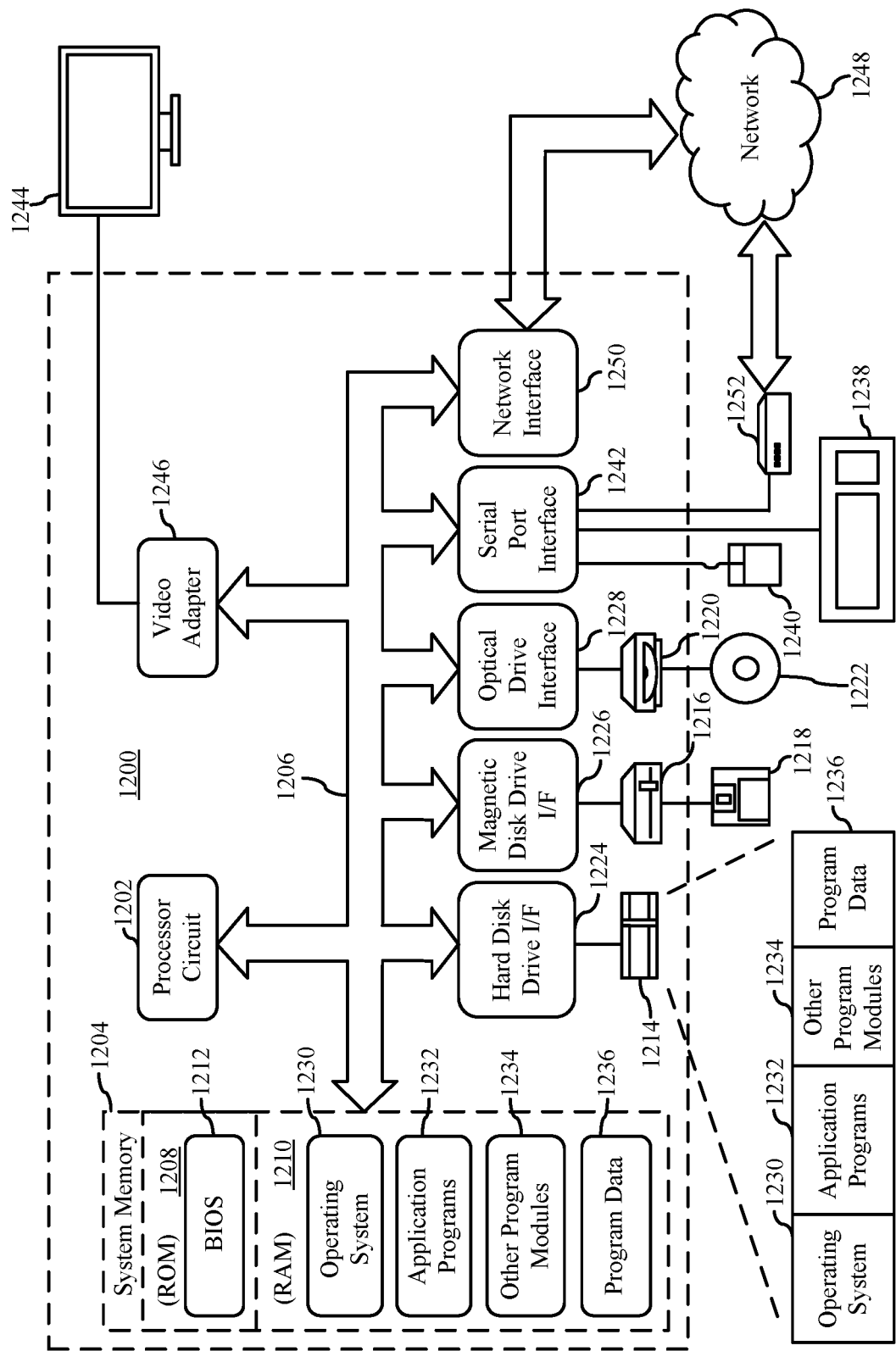
FIG. 12 is a block diagram of an example processor-based computer system that may be used to implement various embodiments.

As shown in FIG. 12, system 1200 includes a processing unit 1202, a system memory 1204, and a bus 1206 that couples various system components including system memory 1204 to processing unit 1202. Processing unit 1202 may comprise one or more circuits, microprocessors or microprocessor cores. Bus 1206 represents one or more of any of several types of bus structures, including a memory bus or memory controller, a peripheral bus, an accelerated graphics port, and a processor or local bus using any of a variety of bus architectures. System memory 1204 includes read only memory (ROM) 1208 and random access memory (RAM) 1210. A basic input/output system 1212 (BIOS) is stored in ROM 1208.

System 1200 also has one or more of the following drives: a hard disk drive 1214 for reading from and writing to a hard disk, a magnetic disk drive 1216 for reading from or writing to a removable magnetic disk 1218, and an optical disk drive 1220 for reading from or writing to a removable optical disk 1222 such as a CD ROM, DVD ROM, BLU-RAY™ disk or other optical media. Hard disk drive 1214, magnetic disk drive 1216, and optical disk drive 1220 are connected to bus 1206 by a hard disk drive interface 1224, a magnetic disk drive interface 1226, and an optical drive interface 1228, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as solid state drives, flash memory cards, digital video disks, random access memories (RAMs), read only memories (ROM), and the like.

A number of program modules may be stored on the hard disk, magnetic disk, optical disk, ROM, or RAM. These program modules include an operating system 1230, one or more application programs 1232, other program modules 1234, and program data 1236. In accordance with various embodiments, the program modules may include computer program logic that is executable by processing unit 1202 to perform any or all of the functions and features of any of computing device 102, agent 108, application 110, configuration recommender 104, statistics modeler 114, price-to-performance modeler 116, computing device 1102, configuration recommender 1104, application deployer 1114, cloud-based compute resources 1116A-1116N, and/or any of the components respectively described therein, and flowcharts 600, 700, 800, 900, and/or 1000, and/or any of the components respectively described therein, as described above. The program modules may also include computer program logic that, when executed by processing unit 1202, causes processing unit 1202 to perform any of the steps of any of the flowcharts of FIGS. 6-10, as described above.

A user may enter commands and information into system 1200 through input devices such as a keyboard 1238 and a pointing device 1240 (e.g., a mouse). Other input devices (not shown) may include a microphone, joystick, game controller, scanner, or the like. In one embodiment, a touch screen is provided in conjunction with a display 1244 to allow a user to provide user input via the application of a touch (as by a finger or stylus for example) to one or more points on the touch screen. These and other input devices are often connected to processing unit 1202 through a serial port interface 1242 that is coupled to bus 1206, but may be connected by other interfaces, such as a parallel port, game port, or a universal serial bus (USB). Such interfaces may be wired or wireless interfaces.

Display 1244 is connected to bus 1206 via an interface, such as a video adapter 1246. In addition to display 1244, system 1200 may include other peripheral output devices (not shown) such as speakers and printers.

System 1200 is connected to a network 1248 (e.g., a local area network or wide area network such as the Internet) through a network interface 1250, a modem 1252, or other suitable means for establishing communications over the network. Modem 1252, which may be internal or external, is connected to bus 1206 via serial port interface 1242.

As used herein, the terms "computer program medium," "computer-readable medium," and "computer-readable storage medium" are used to generally refer to memory devices or storage structures such as the hard disk associated with hard disk drive 1214, removable magnetic disk 1218, removable optical disk 1222, as well as other memory devices or storage structures such as flash memory cards, digital video disks, random access memories (RAMs), read only memories (ROM), and the like. Such computer-readable storage media are distinguished from and non-overlapping with communication media and modulated data signals (do not include communication media or modulated data signals). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media. Embodiments are also directed to such communication media that are separate and non-overlapping with embodiments directed to computer-readable storage media.

As noted above, computer programs and modules (including application programs 1232 and other program modules 1234) may be stored on the hard disk, magnetic disk, optical disk, ROM, or RAM. Such computer programs may also be received via network interface 1250, serial port interface 1242, or any other interface type. Such computer programs, when executed or loaded by an application, enable system 1200 to implement features of embodiments discussed herein. Accordingly, such computer programs represent controllers of the system 1200.

Embodiments are also directed to computer program products comprising software stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to memory devices and storage structures such as RAM, hard drives, solid state drives, floppy disks, CD ROMs, DVD ROMs, zip disks, tapes, magnetic storage devices, optical storage devices, MEMs, nanotechnology-based storage devices, and the like.

IV. Additional Exemplary Embodiments

A system is described herein. The system comprises at least one processor circuit; and at least one memory that stores program code configured to be executed by the at least one processor circuit, the program code comprising: a configuration recommender configured to: receive a plurality of time series of data values, each time series of the plurality of time series representative of a behavior of a respective metric, of a plurality of metrics, associated with a respective computing resource of an on-premise computing device during execution of an application on the on-premise computing device: generate a respective score for each cloud-based compute resource configuration of a plurality of cloud-based compute resource configurations of a cloud-based platform based on the plurality of time series, each score representing a probability that the application does not require throttling when executed on the cloud-based compute resource configuration: select a cloud-based compute resource configuration from the plurality of cloud-based compute resource configurations based at least on the scores; and deploy the application on the selected cloud-based compute resource configuration.

In accordance with the foregoing system, the configuration recommender is further configured to: for each cloud-based compute resource configuration of the plurality of cloud-based compute resource configurations: determine, for each metric of the plurality of metrics, a probability that the cloud-based compute resource configuration accommodates the behavior of the metric without throttling the application when executed on the cloud-based compute resource configuration; and combine the probabilities to generate the score for the cloud-based compute resource configuration.

In accordance with the foregoing system, the configuration recommender is further configured to: for each cloud-based compute resource configuration of the plurality of cloud-based compute resource configurations, receive a respective cost value for utilizing the cloud-based compute resource configuration; and determine candidate cloud-based compute resource configurations based on the scores generated for the plurality of cloud-based compute resource configurations and the cost values received for the plurality of cloud-based compute resource configurations, the candidate cloud-based compute resource configurations comprising a subset of cloud-based compute resource configurations from the plurality of cloud-based compute resource configurations.

In accordance with the foregoing system, the configuration recommender is further configured to: associate a customer of a cloud-based platform associated with the on-premise computing device with a group of customers of the cloud-based platform based on a first level of similarity therebetween: determine a respective cloud-based compute resource configuration of the plurality of cloud-based compute resource configurations utilized by each of the customers, the scores being generated for the determined cloud-based compute resource configurations: average the scores to generate an average score; and select a cloud-based compute resource configuration from the candidate cloud-based compute resource configurations that is associated with a score having a second level of similarity to the average score.

In accordance with the foregoing system, the configuration recommender is further configured to: provide a recommendation to the customer recommending the selected cloud-based compute resource configuration: receive user input that indicates that the customer has designated the selected cloud-based compute resource configuration for migration; and responsive to receiving the user input, deploy the application on the selected cloud-based compute resource configuration.

In accordance with the foregoing system, each cloud-based compute resource configuration of the plurality of cloud-based compute resource configuration comprises at least one of: a number of central processing unit cores maintained by a respective cloud-based compute resource: an amount of storage maintained by the respective cloud-based compute resource: an amount to memory maintained by the respective cloud-based compute resource: or a number of input/output operations per second supported by the respective cloud-based compute resource.

In accordance with the foregoing system, the respective cloud-based compute resource comprises at least one of: a server maintained by the cloud-based platform; or a virtual machine maintained by the cloud-based platform.

A computer-implemented method is also described herein. The method comprises: receiving a plurality of time series of data values, each time series of the plurality of time series representative of a behavior of a respective metric, of a plurality of metrics, associated with a respective computing resource of an on-premise computing device during execution of an application on the on-premise computing device: generating a respective score for each cloud-based compute resource configuration of a plurality of cloud-based compute resource configurations of a cloud-based platform based on the plurality of time series, each score representing a probability that the application does not require throttling when executed on the cloud-based compute resource configuration: selecting a cloud-based compute resource configuration from the plurality of cloud-based compute resource configurations based at least on the scores; and deploying the application on the selected cloud-based compute resource configuration.

In accordance with the foregoing computer-implemented method, said generating comprises: for each cloud-based compute resource configuration of the plurality of cloud-based compute resource configurations: determining, for each metric of the plurality of metrics, a probability that the cloud-based compute resource configuration accommodates the behavior of the metric without throttling the application when executed on the cloud-based compute resource configuration; and combining the probabilities to generate the score for the cloud-based compute resource configuration.

In accordance with the foregoing computer-implemented method, said generating comprises: for each cloud-based compute resource configuration of the plurality of cloud-based compute resource configurations, receiving a respective cost value for utilizing the cloud-based compute resource configuration; and determining candidate cloud-based compute resource configurations based on the scores generated for the plurality of cloud-based compute resource configurations and the cost values received for the plurality of cloud-based compute resource configurations, the candidate cloud-based compute resource configurations comprising a subset of cloud-based compute resource configurations from the plurality of cloud-based compute resource configurations.

In accordance with the foregoing computer-implemented method, said selecting comprises: associating a customer of a cloud-based platform associated with the on-premise computing device with a group of customers of the cloud-based platform based on a first level of similarity therebetween: determining a respective cloud-based compute resource configuration of the plurality of cloud-based compute resource configurations utilized by each of the customers, the scores being generated for the determined cloud-based compute resource configurations: averaging the scores to generate an average score; and selecting a cloud-based compute resource configuration from the candidate cloud-based compute resource configurations that is associated with a score having a second level of similarity to the average score.

In accordance with the foregoing computer-implemented method, said deploying comprises: providing a recommendation to the customer recommending the selected cloud-based compute resource configuration: receiving user input that indicates that the customer has designated the selected cloud-based compute resource configuration for migration; and responsive to receiving the user input, deploying the application on the selected cloud-based compute resource configuration.

In accordance with the foregoing computer-implemented method, each cloud-based compute resource configuration of the plurality of cloud-based compute resource configuration comprises at least one of: a number of central processing unit cores maintained by a respective cloud-based compute resource: an amount of storage maintained by the respective cloud-based compute resource: an amount to memory maintained by the respective cloud-based compute resource: or a number of input/output operations per second supported by the respective cloud-based compute resource.

In accordance with the foregoing computer-implemented method, the respective cloud-based compute resource comprises at least one of: a server maintained by the cloud-based platform: or a virtual machine maintained by the cloud-based platform.

A computer-readable storage medium having program instructions recorded thereon that, when executed by a processor of a computing device, perform a method is further described herein. The method includes: receiving a plurality of time series of data values, each time series of the plurality of time series representative of a behavior of a respective metric, of a plurality of metrics, associated with a respective computing resource of an on-premise computing device during execution of an application on the on-premise computing device: generating a respective score for each cloud-based compute resource configuration of a plurality of cloud-based compute resource configurations of a cloud-based platform based on the plurality of time series, each score representing a probability that the application does not require throttling when executed on the cloud-based compute resource configuration: selecting a cloud-based compute resource configuration from the plurality of cloud-based compute resource configurations based at least on the scores; and deploying the application on the selected cloud-based compute resource configuration.

In accordance with the foregoing computer-readable storage medium, said generating comprises: for each cloud-based compute resource configuration of the plurality of cloud-based compute resource configurations: determining, for each metric of the plurality of metrics, a probability that the cloud-based compute resource configuration accommodates the behavior of the metric without throttling the application when executed on the cloud-based compute resource configuration; and combining the probabilities to generate the score for the cloud-based compute resource configuration.

In accordance with the foregoing computer-readable storage medium, said generating comprises: for each cloud-based compute resource configuration of the plurality of cloud-based compute resource configurations, receiving a respective cost value for utilizing the cloud-based compute resource configuration; and determining candidate cloud-based compute resource configurations based on the scores generated for the plurality of cloud-based compute resource configurations and the cost values received for the plurality of cloud-based compute resource configurations, the candidate cloud-based compute resource configurations comprising a subset of cloud-based compute resource configurations from the plurality of cloud-based compute resource configurations.

In accordance with the foregoing computer-readable storage medium, said selecting comprises: associating a customer of a cloud-based platform associated with the on-premise computing device with a group of customers of the cloud-based platform based on a first level of similarity therebetween: determining a respective cloud-based compute resource configuration of the plurality of cloud-based compute resource configurations utilized by each of the customers, the scores being generated for the determined cloud-based compute resource configurations: averaging the scores to generate an average score; and selecting a cloud-based compute resource configuration from the candidate cloud-based compute resource configurations that is associated with a score having a second level of similarity to the average score.

In accordance with the foregoing computer-readable storage medium, said deploying comprises: providing a recommendation to the customer recommending the selected cloud-based compute resource configuration; receiving user input that indicates that the customer has designated the selected cloud-based compute resource configuration for migration; and responsive to receiving the user input, deploying the application on the selected cloud-based compute resource configuration.

In accordance with the foregoing computer-readable storage medium, each cloud-based compute resource configuration of the plurality of cloud-based compute resource configuration comprises at least one of: a number of central processing unit cores maintained by a respective cloud-based compute resource: an amount of storage maintained by the respective cloud-based compute resource: an amount to memory maintained by the respective cloud-based compute resource: or a number of input/output operations per second supported by the respective cloud-based compute resource.

V. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A system, comprising:
at least one processor circuit; and
at least one memory that stores program code configured to be executed by the at least one processor circuit, the program code comprising:
a configuration recommender configured to:
receive a plurality of time series of data values, each time series of the plurality of time series representative of a behavior of a respective metric, of a plurality of metrics, associated with a respective computing resource of an on-premise computing device during execution of an application on the on-premise computing device, the on-premise computing device associated with a first customer;
determine a group of second customers having a first level of similarity to the first customer;
generate a respective score for each cloud-based compute resource configuration of a plurality of cloud-based compute resource configurations of a cloud-based platform based on the plurality of time series, each score representing a probability that the application does not require throttling when executed on the respective cloud-based compute resource configuration, each of the cloud-based compute resource configurations utilized by a respective second customer of the group of second customers;
select a cloud-based compute resource configuration from the plurality of cloud-based compute resource configurations based at least on the scores; and
deploy the application on the selected cloud-based compute resource configuration.

2. The system of claim 1, wherein the configuration recommender is further configured to:
for each cloud-based compute resource configuration of the plurality of cloud-based compute resource configurations:
determine, for each metric of the plurality of metrics, a probability that the cloud-based compute resource configuration accommodates the behavior of the metric without throttling the application when executed on the cloud-based compute resource configuration; and
combine the probabilities to generate the score for the cloud-based compute resource configuration.

3. The system of claim 1, wherein the configuration recommender is further configured to:
for each cloud-based compute resource configuration of the plurality of cloud-based compute resource configurations, receive a respective cost value for utilizing the cloud-based compute resource configuration; and
determine candidate cloud-based compute resource configurations based on the scores generated for the plurality of cloud-based compute resource configurations and the cost values received for the plurality of cloud-based compute resource configurations, the candidate cloud-based compute resource configurations comprising a subset of cloud-based compute resource configurations from the plurality of cloud-based compute resource configurations.

4. The system of claim 3, wherein the configuration recommender is further configured to:
determine the respective cloud-based compute resource configurations utilized by each of the second customers;

average the scores to generate an average score; and
select a cloud-based compute resource configuration from the candidate cloud-based compute resource configurations that is associated with a score having a second level of similarity to the average score.

5. The system of claim 4, wherein the configuration recommender is further configured to:
provide a recommendation to the first customer recommending the selected cloud-based compute resource configuration;
receive user input that indicates that the first customer has designated the selected cloud-based compute resource configuration for migration; and
responsive to receiving the user input, deploy the application on the selected cloud-based compute resource configuration.

6. The system of claim 1, wherein each cloud-based compute resource configuration of the plurality of cloud-based compute resource configuration comprises at least one of:
a number of central processing unit cores maintained by a respective cloud-based compute resource;
an amount of storage maintained by the respective cloud-based compute resource;
an amount to memory maintained by the respective cloud-based compute resource; or
a number of input/output operations per second supported by the respective cloud-based compute resource.

7. The system of claim 6, wherein the respective cloud-based compute resource comprises at least one of:
a server maintained by the cloud-based platform; or
a virtual machine maintained by the cloud-based platform.

8. A computer-implemented method, comprising:
receiving a plurality of time series of data values, each time series of the plurality of time series representative of a behavior of a respective metric, of a plurality of metrics, associated with a respective computing resource of an on-premise computing device during execution of an application on the on-premise computing device;
for each cloud-based compute resource configuration of a plurality of cloud-based compute resource configurations of a cloud-based platform:
determining, for each metric of the plurality of metrics, a probability that the cloud-based compute resource configuration accommodates the behavior of the metric without throttling the application when executed on the cloud-based compute resource configuration, and
combining the probabilities to generate a score for the cloud-based compute resource configuration, the score representing a probability that the application does not require throttling when executed on the cloud-based compute resource configuration;
selecting a cloud-based compute resource configuration from the plurality of cloud-based compute resource configurations based at least on the scores; and
deploying the application on the selected cloud-based compute resource configuration.

9. The computer-implemented method of claim 8, wherein said generating comprises:
for each cloud-based compute resource configuration of the plurality of cloud-based compute resource configurations, receiving a respective cost value for utilizing the cloud-based compute resource configuration; and determining candidate cloud-based compute resource configurations based on the scores generated for the plurality of cloud-based compute resource configurations and the cost values received for the plurality of cloud-based compute resource configurations, the candidate cloud-based compute resource configurations comprising a subset of cloud-based compute resource configurations from the plurality of cloud-based compute resource configurations.

10. The computer-implemented method of claim 9, wherein said selecting comprises:
associating a customer of a cloud-based platform associated with the on-premise computing device with a group of customers of the cloud-based platform based on a first level of similarity therebetween;
determining a respective cloud-based compute resource configuration of the plurality of cloud-based compute resource configurations utilized by each of the customers, the scores being generated for the determined cloud-based compute resource configurations;
averaging the scores to generate an average score; and
selecting a cloud-based compute resource configuration from the candidate cloud-based compute resource configurations that is associated with a score having a second level of similarity to the average score.

11. The computer-implemented method of claim 10, wherein said deploying comprises:
providing a recommendation to the customer recommending the selected cloud-based compute resource configuration;
receiving user input that indicates that the customer has designated the selected cloud-based compute resource configuration for migration; and
responsive to receiving the user input, deploying the application on the selected cloud-based compute resource configuration.

12. The computer-implemented method of claim 8, wherein each cloud-based compute resource configuration of the plurality of cloud-based compute resource configuration comprises at least one of:
a number of central processing unit cores maintained by a respective cloud-based compute resource;
an amount of storage maintained by the respective cloud-based compute resource;
an amount to memory maintained by the respective cloud-based compute resource; or
a number of input/output operations per second supported by the respective cloud-based compute resource.

13. The computer-implemented method of claim 12, wherein the respective cloud-based compute resource comprises at least one of:
a server maintained by the cloud-based platform; or
a virtual machine maintained by the cloud-based platform.

14. A computer-readable storage medium having program instructions recorded thereon that, when executed by at least one processor, perform a method comprising:
receiving a plurality of time series of data values, each time series of the plurality of time series representative of a behavior of a respective metric, of a plurality of metrics, associated with a respective computing resource of an on-premise computing device during execution of an application on the on-premise computing device, the on-premise computing device associated with a first customer;
determine a group of second customers having a first level of similarity to the first customer;

generating a respective score for each cloud-based compute resource configuration of a plurality of cloud-based compute resource configurations of a cloud-based platform based on the plurality of time series, each score representing a probability that the application does not require throttling when executed on the respective cloud-based compute resource configuration, each of the cloud-based compute resource configurations utilized by a respective second customer of the group of second customers;

selecting a cloud-based compute resource configuration from the plurality of cloud-based compute resource configurations based at least on the scores; and deploying the application on the selected cloud-based compute resource configuration.

15. The computer-readable storage medium of claim 14, wherein said generating comprises:

for each cloud-based compute resource configuration of the plurality of cloud-based compute resource configurations:
   determining, for each metric of the plurality of metrics, a probability that the cloud-based compute resource configuration accommodates the behavior of the metric without throttling the application when executed on the cloud-based compute resource configuration; and
   combining the probabilities to generate the score for the cloud-based compute resource configuration.

16. The computer-readable storage medium of claim 14, wherein said generating comprises:

for each cloud-based compute resource configuration of the plurality of cloud-based compute resource configurations, receiving a respective cost value for utilizing the cloud-based compute resource configuration; and determining candidate cloud-based compute resource configurations based on the scores generated for the plurality of cloud-based compute resource configurations and the cost values received for the plurality of cloud-based compute resource configurations, the candidate cloud-based compute resource configurations comprising a subset of cloud-based compute resource configurations from the plurality of cloud-based compute resource configurations.

17. The computer-readable storage medium of claim 16, wherein the method further comprises:

determining the respective cloud-based compute resource configurations utilized by each of the second customers;

averaging the scores to generate an average score; and selecting a cloud-based compute resource configuration from the candidate cloud-based compute resource configurations that is associated with a score having a second level of similarity to the average score.

18. The computer-readable storage medium of claim 17, wherein said deploying comprises:

providing a recommendation to the first customer recommending the selected cloud-based compute resource configuration;

receiving user input that indicates that the first customer has designated the selected cloud-based compute resource configuration for migration; and responsive to receiving the user input, deploying the application on the selected cloud-based compute resource configuration.

19. The computer-readable storage medium of claim 14, wherein each cloud-based compute resource configuration of the plurality of cloud-based compute resource configuration comprises at least one of:

a number of central processing unit cores maintained by a respective cloud-based compute resource;

an amount of storage maintained by the respective cloud-based compute resource;

an amount to memory maintained by the respective cloud-based compute resource; or a number of input/output operations per second supported by the respective cloud-based compute resource.

20. The system of claim 1, wherein the configuration recommender is further configured to:

average the scores to generate an average score; and select the cloud-based compute resource configuration from the plurality of cloud-based compute resource configurations based on a second level of similarity between the average score and the respective score of the selected cloud-based compute resource configuration.

* * * * *